Nov. 27, 1951 S. E. HEYMANN 2,576,757
VEHICLE HEATING SYSTEM
Filed Sept. 10, 1949 2 SHEETS—SHEET 1
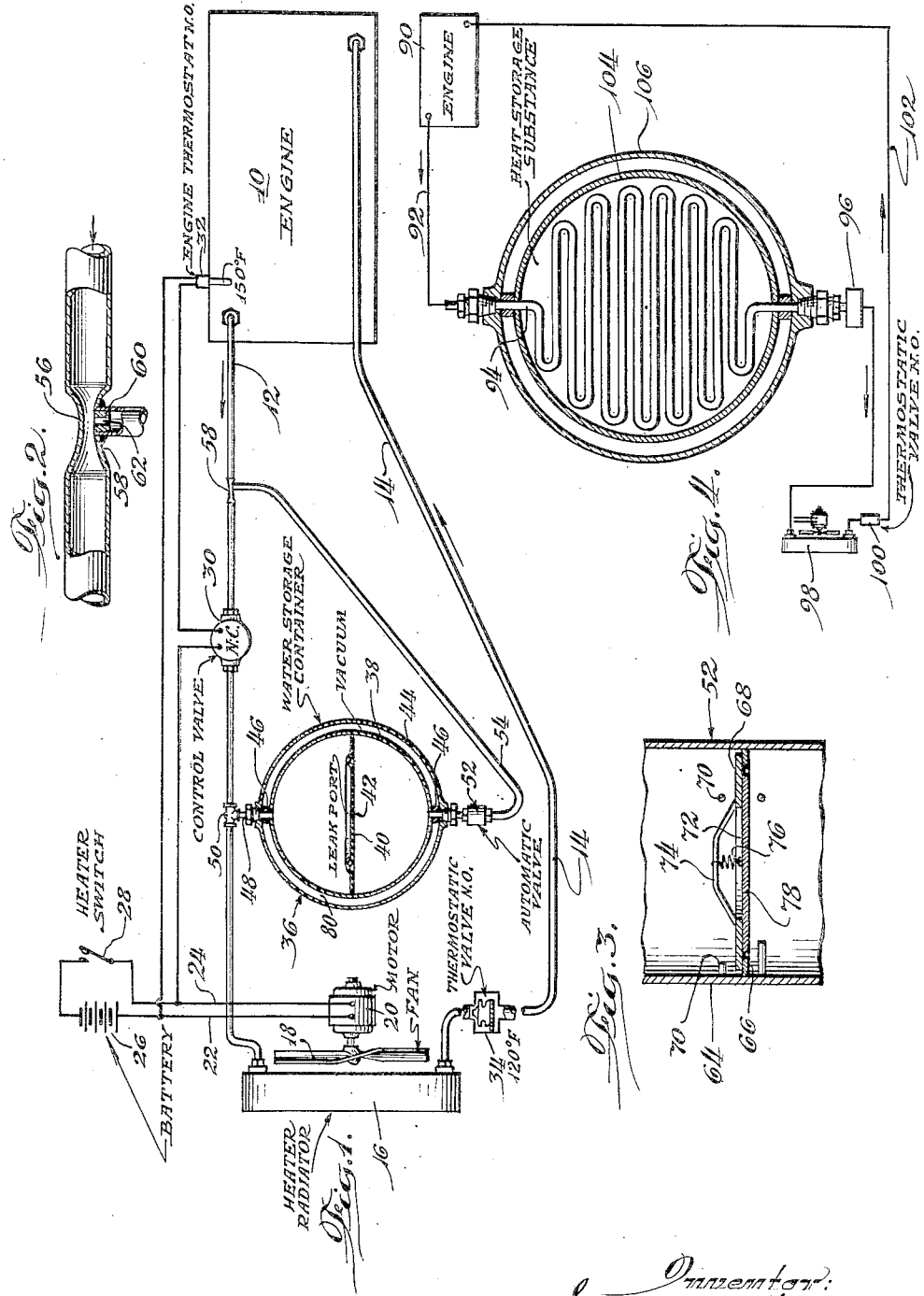
Inventor:
Seymour E. Heymann
By Hinkle, Horton, Ahlberg, Hansmann & Wupper
Attorneys

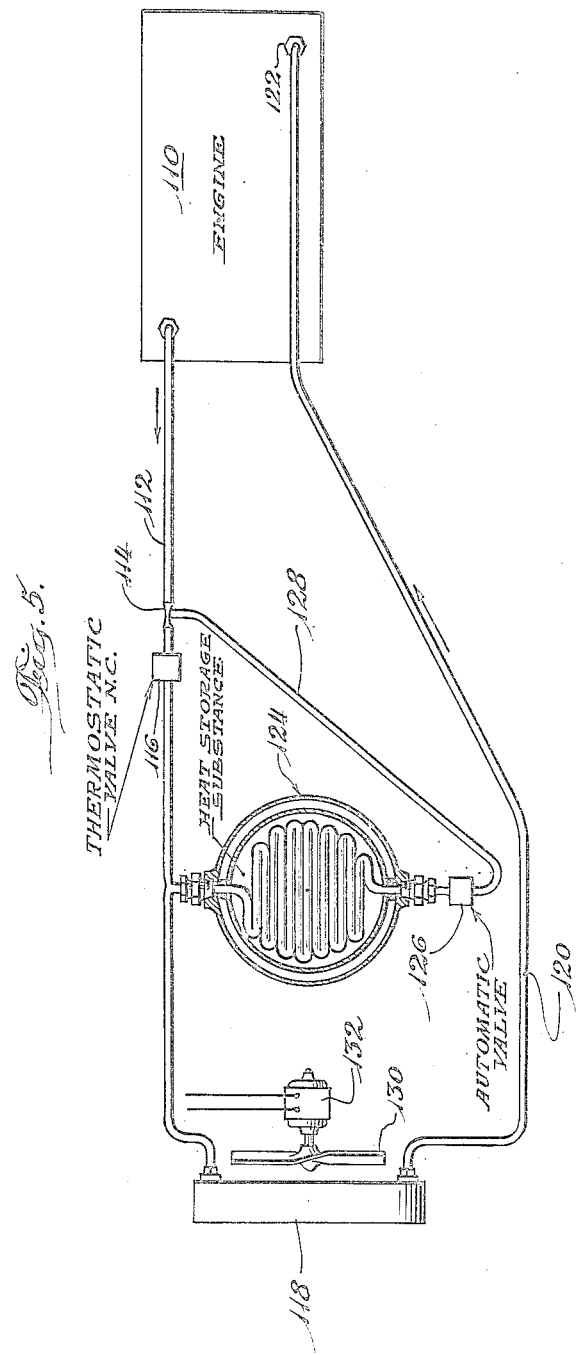

Patented Nov. 27, 1951

2,576,757

UNITED STATES PATENT OFFICE 2,576,757

VEHICLE HEATING SYSTEM

Seymour E. Heymann, Los Angeles, Calif., assignor to Stewart-Warner Corporation, Chicago, Ill., a corporation of Virginia Application September 10, 1949, Serial No. 114,997

12 Claims. (Cl. 237—8)

The present invention relates to vehicle heating systems and more particularly is concerned with improving hot water type heating systems for automotive vehicles of the type in which the cooling water circulated through the vehicle engine block is used for heating a radiator in the passenger compartment.

Automotive vehicle heating systems are well known in which a liquid, usually water mixed with a freezing point depressant, heated by the engine while cooling the latter is circulated through tubing to a small radiator in the passenger compartment. Heat is extracted from the radiator by air blown therethrough by a small electric motor. The result is that the heat supplied to the driver's compartment depends entirely upon the temperature of the water in the engine cooling system.

Such heating systems are quite satisfactory excepting that there is a considerable lag between the time the vehicle is put into operation and the time an appreciable amount of heat is received in the passenger compartment. In cold weather this is highly objectionable since most automobiles, particularly passenger automobiles, are used mostly for short runs during which periods insufficient heat may be received in the passenger compartment until about the time the vehicle has arrived at the destination. Boosting systems have been proposed in which a heating system of the above described type receives water at a reasonably high temperature quite quickly by passing the water on its way from the engine to the heater radiator through a combustion type hot water heater which raises the temperature of the water to a satisfactory level, the combustion heater later being turned off when the engine water arrives at some predetermined temperature level. These latter type heating systems in some instances work quite well, but are necessarily quite expensive.

It is one of the objects of the present invention to provide an improved hot water heating system for automotive vehicles which supplies heat to the passenger compartment immediately upon placing the vehicle in operation even though the temperature of the water in the vehicle engine is low.

Yet another object is to accomplish this at extremely low cost, in an inherently safe manner and without the use of supplemental heating devices.

Other objects and advantages will become apparent from the following description of a preferred embodiment of my invention which is illustrated in the accompanying drawings, in which:

Fig. 1 is a diagrammatic representation of a heating system embodying the teachings of the present invention;

Fig. 2 is a diagrammatic longitudinal sectional view through one of the components of the heating system of Fig. 1;

Fig. 3 is a diagrammatic longitudinal sectional view through another component thereof;

Fig. 4 is a diagrammatic view partly in section showing an alternative arrangement for practicing the teachings of the present invention; and Fig. 5 is a diagrammatic representation of still another alternative form of the invention.

By referring to Fig. 1, it will be seen that a vehicle internal combustion engine is indicated at 10 having a hot water outlet pipe 12 leading therefrom while a water return pipe is indicated at 14. The engine, of course, is equipped with the usual accessories including a water cooling radiator and the like, but these are not shown since they form no part of the present invention and would not contribute to an understanding thereof. The far ends of the pipes 12 and 14 are connected to a small heater radiator 16 which comprises a heat exchanger of any suitable type located in the driver's compartment and through which the water is circulated from the pipe 12 to the pipe 14. Air is passed through the radiator 16 by a fan 18 driven by a small electric motor 20 electrically connected by leads 22 and 24 to the vehicle battery 26, a single pole single throw heater switch 28 being connected in series therewith to control energization of the motor. If desired, the vehicle ignition switch and an ammeter may be placed in this circuit in the customary manner.

The pipe 12 leading from the engine to the heater radiator 16 includes a normally closed magnetically operated valve 30 in circuit therewith so that flow of water from the engine 10 to the radiator 16 is interrupted when the valve 30 is de-energized while flow in this direction is permitted whenever this valve receives energy from the battery 26.

This valve is electrically connected in a series circuit with a normally open thermostatic switch, indicated at 32, and the battery leads 22 and 24. Thus, the valve 30 is de-energized and therefore closed unless the temperature within the engine cooling system rises to some predetermined level at which point the engine thermostatic switch 32 will close and energize the control valve 30.

Although, as will be pointed out presently, the temperature at which the switch 32 closes may vary within wide limits depending upon the heating results desired, it will be assumed for the purpose of illustration to close at a temperature of the order of 150 degrees F. The valve 30, therefore, remains closed during the period of time that the engine 10 is heating up to a water temperature of approximately 150 degrees.

The return line 14 leading from the heating radiator 16 to the engine 10 includes a thermostatically operated valve 34 in its circuit. Preferably this thermostatic valve is located near the heater 16 and is designed to close and permit only a low flow rate through the pipe 14 when the temperature of the thermostatic valve has reached some predetermined level, such as about 120 degrees F., for instance. In the closed position, however, some leakage is designed to take place so as to make the valve sensitive to a change in water temperature even when the valve is closed. Below the set temperature this valve remains open and permits free flow therethrough.

The device indicated at 36 which will be referred to as a heat storage device comprises an inner vessel, preferably spherical, which is formed, for instance, as a metal shell 38 divided across the middle by a flexible diaphragm 40. This diaphragm has a small leak port 42 therethrough and is sufficiently flexible and elastic so that it will substantially conform to the inner surface of either the upper or lower half of the vessel 38 depending upon which side of the diaphragm 40 is at the higher pressure. This vessel 38 is enclosed within an outer shell 44 and is supported and spaced therefrom by passage forming fittings 46 at the top and bottom, the upper of which is connected by a pipe 48 to a T-fitting 50 inserted in the portion of the line 12 between the downstream end of the valve 30 and the inlet to the radiator 16. This arrangement provides communication between the pipe line 12 downstream of the valve 30 and the portion of the space within the chamber 38 above the diaphragm 40.

The similar fitting 46 at the lower end of the container communicates with an automatic valve 52 and thence with a tube 54 which leads to the throat 56 of a venturi 58 connected at its ends in the portion of the pipe line 12 upstream of the pipe line 30, that is, between the valve 30 and the engine 10. Flow through the pipe 54 should be at a controlled rate and therefore, as shown in Fig. 2, the line 54 at the point where it joins the Venturi throat 56 has a restrictor consisting of a plug 60 having a small passage 62 therethrough.

The automatic valve 52 is shown in greater detail in Fig. 3 where it will be seen that this valve comprises a casing 64 having a flat annular valve seat projecting slightly from the wall thereof. An annular disk-like valve member 68 lies upon this seat in sealing relation therethrough and is prevented from moving an unrestricted distance away from the seat by several pins 70 which project inwardly from the side wall of the casing 64 in a position slightly above the valve disk 68. This disk has an opening 72 through the center thereof which is straddled by a bar or spider 74, the center of which anchors the upper end of a soft-acting coil spring 76. The lower end of this spring is attached to a second valve disk 78 somewhat smaller in diameter than the opening through the valve seat 66. The spring 76 holds this valve member 78 upwardly against the lower face of the annular valve member 68 so as to form a seal therewith.

The purpose of the valve 52 is to prevent flow through the pipe 54 in either direction unless the pressure across the valve has reached some predetermined although exceedingly low level. If the pressure below the valve rises slightly it will lift the weight of the valve member 68, the spring 76 and the valve member 78, thus permitting the fluid to pass through the opening in the valve seat 66 and around the outer edge of the valve member 68. If the pressure above the valve is higher than the pressure below, the spring 76 is slightly extended by the pressure operating against the upper surface of the disk 78 so as to permit the liquid to flow downwardly through the central opening 72 in the valve member 68 and around the edge of the lower valve member 78. This valve is intended to operate in either direction at a very low pressure differential but is sufficient to prevent flow which otherwise might take place purely due to thermosiphon effects caused by differences in temperature within the system.

The space 80 between the inner shell 38 and the outer shell 44 is evacuated to a low pressure during assembly of this device so as to prevent transfer of heat from the inside to the outside of the container. Preferably, also, the outer surface of the inner container 38 and the inner surface of the shell 44 are polished or silvered or otherwise given a highly reflective surface so as to prevent in so far as is practical the transfer of heat from the inside to the outside of the container by radiation. The device, therefore, resembles in its construction a vacuum bottle and has the property of maintaining the liquid therein at a high temperature over long periods of time even though the temperature outside the outer shell 44 is at a comparatively low level.

The device operates in the following manner. If it is assumed that the engine has been in operation for some time and the temperature of the cooling fluid therein is at a relatively high level, well above 150 degrees, it will be seen that the control valve 30 will be open and fluid will be flowing from the engine through the venturi 58 and valve 30 to the radiator 16 and will be returning by way of the valve 34 and pipe 14. The valve 34 may be wide open or at least partially open because although this valve is set to close at temperatures above 120 degrees the radiator and fan 16 will extract sufficient heat from the water so that with only slight restriction by the valve 34 the water leaving the radiator 16 will be at about 120 degrees. Under these conditions of operation flow through the Venturi throat 56 will produce a low pressure therein which is communicated through the orifice 62 and pipe 54 to the space below the diaphragm 40. Because of this connection to the Venturi throat 56 the pressure prevailing within the lower half of the container 38 will be less than the pressure above the diaphragm 40 with the result that hot water will flow from the fitting 50 downwardly into the upper half of the chamber 38 so as to force the diaphragm downwardly and displace water beneath the diaphragm 40 into the line 54 and back to the Venturi throat 56. This pressure differential is sufficient to extend the spring 76 and operate the automatic valve 52. Because of the restricting effect of the orifice 62 in the plug 60, the flow of water into the Venturi throat 56 is at a low and controlled rate to that the cool water flowing into the line 12 does not appreciably depress the temperature of the water reaching the radiator 16. This process continues until the diaphragm 40 closely conforms to the inner surface of the lower half of the shell 38 under which conditions the container 38 is completely filled with hot water. With continuing operation of the system, water continues to leak slowly through the leak port 42 so that the temperature in the container 38 is continuously maintained at a high level.

When the driver arrives at his destination and turns off the heater by opening the switch 28, the valve 30 will be de-energized and closed. The water within the container 38 therefore is trapped and any temperature difference within the system will not cause gradual replacement of the hot water in the container 38 by cool water in the engine system because such flow at low pressure is inhibited by the valve 52.

When next the vehicle is placed in operation, say, within 12 to 24 hours, water within the container 38 will have cooled somewhat but will still remain quite hot. Inasmuch as the thermostatic switch 32 is below 150 degrees it remains open and the valve 30 remains closed even though the heater is in operation. Flow of cold water from the engine, therefore, into the pipe 12 is inhibited by the valve 30 with the result that the pressure differential across this valve is considerable. Cold water, therefore, flows through the orifice 62 and into the pipe 54 and through the valve 52. This cold water flowing into the lower half of the container 38 forces the diaphragm 40 upwardly, thereby displacing hot water from the container 38 into the T-fitting 50 and thence to the radiator 16. If this hot water tends to flow through the radiator 16 at too high a rate so that the amount of hot water available would soon be exhausted the valve 34 closes somewhat so that water leaving the radiator 16 is held to a temperature of 120 degrees or therebelow. The heating system, therefore, makes efficient use of the hot water in the container 38.

The diaphragm 40 serves the purpose of preventing mixing of the cold entering water with the hot water contained in the upper portion of the envelope 38 and although slight communication across the diaphragm 40 is provided by the leak port 42, this amount is not sufficient to affect the temperature of the water within the container to any appreciable extent during the time hot water is being drained from the container 38 to the radiator 16.

Immediately upon starting the engine 10, therefore, even though the engine is quite cold, hot water will be received by the radiator 16. After a few minutes of operation, the water within the engine 10 will arrive at 150 degrees temperature, thereby closing the thermostatic switch 32 and operating the control valve 30. As soon as this happens, hot water flows directly from the engine 10 to the radiator 16 and as has been previously described the flow of this hot water through the Venturi throat 58 produces a low pressure at the throat so as to cause hot water to flow from the T-fitting downwardly into the container 38 while displacing the cool water from below the diaphragm 40 back to the Venturi throat 56. The container 38, therefore, is refilled with hot water in preparation for another cycle.

It will be seen that this heating system provides for the automatic storage of excess hot water during operation of the vehicle engine and automatically returns this hot water to the heater radiator 16 whenever the cooling fluid in the vehicle engine is below some predetermined level, in the present instance, 150 degrees. The system does this without attention and is inherently safe, thereby making it possible to dispense with the expensive safety controls necessary with a system which depends upon combustion as a source of heat.

It will be appreciated that the temperatures given for the operating points for the switch 32 and the thermostatic valve 34 may be varied within wide limits, depending upon the heating effect desired. The capacity of the container 38 will be determined by the desired flow capacity for the heater radiator 16 and by the rate at which the vehicle engine 10 heats up. It will also be determined to some extent, of course, by the length of time the automobile is likely to be placed out of operation and the efficacy of the insulation for the container 38.

In most instances, automobiles are used by their owners for driving to their places of employment and for returning the same day. Under these conditions the engine will be operating at least once every 12 hours and for this type duty I find that a container 38 having a capacity of 15 to 20 pounds of water will be sufficient for most purposes. This figure is of course given by way of illustration and is not intended to limit the invention to any such capacity.

The alternative form of the invention shown in Fig. 4 has some advantages over that illustrated in Figs. 1, 2 and 3 principally in that the temperature at which it operates is more constant. Also, the liquid capacity of the cooling system may be less, thus giving some saving in the cost of the antifreeze substance used for depressing the freezing point of the water. In Fig. 4 the engine 90 has a cooling system outlet fitting connecting to a line 92 leading to a heat exchange coil 94, the other end of which is connected through an automatic valve 96 having the construction shown in Fig. 3. The outlet side of the valve 96 in turn is connected to the inlet of the heater radiator 98 located within the driver's compartment. The outlet side of this radiator is connected through a normally open thermostatic valve 100 of the type shown at 34 in Fig. 1 and thence by way of a pipe 102 the water returns to the engine 90.

The heat exchange coil 94 is confined within a container shell 104 enclosed within an envelope 106 similar to the arrangement shown in Fig. 1 with the space between the shells 104 evacuated or otherwise well insulated to inhibit loss of heat from the inner container 104. Although in the interest of simplicity of illustration the heat exchanger 94 is shown as a simple coil without secondary heat exchange surfaces thereon, it will be appreciated that finned coils may be used if desired and, in fact, their use may be preferable in some designs in order to accomplish more rapid heat exchange.

The space within the container 104 is filled with a substance which changes its physical state at some desired temperature. One substance suitable for this purpose is paraffin which is available with various melting points within the range of about 140 degrees to 165 degrees F. If it is assumed that the paraffin used for this purpose is of the type which melts between 160 and 165 degrees it will be appreciated that so long as hot water above 165 degrees is brought from the engine 90 to the heater 98 paraffin within the container 104 will be melting. Until all of the paraffin is melted the temperature of the water leaving the outlet end of the heat exchange coil 94 cannot rise substantially above 165 degrees. The heater radiator 98, therefore, receives water at about 160 to 165 degrees less the minor loss in the portion of the line between the heat exchange coil 94 and the heater radiator 98. Once all of the paraffin has been melted the water temperature will rise as the liquid paraffin is heated to a higher temperature until eventually equilibrium will be reached so that water flowing from the engine into the heat exchange coil and the water flowing from the heat exchange coil to the raditor 98 will be at substantially the same temperature, say, 175 degrees.

If, now, the vehicle engine is stopped, the flow of water through the heat exchange coil will be cut off by the automatic valve 96 and the paraffin within the container 104 will remain in a liquid state for long periods of time. When the vehicle is again placed in operation, cold water passing into the heat exchange coil 94 will be heated by the melted paraffin and will leave the lower end of the heat exchange coil at a temperature of approximately 160 to 165 degrees. As in the first example, wastage of this hot water is prevented by the thermostatic valve 100 which restricts flow through the system to a rate such that the outlet temperature of the heater radiator 98 is not above 120 degrees. As more and more cold water passes into the heat exchange coil 94, more and more of the paraffin will exchange its heat to the water and will freeze, but so long as there is any unfrozen paraffin remaining within the container 104 the temperature of the water leaving the heat exchange coil will be at approximately 160 to 165 degrees. If, meanwhile, the temperature of the water from the engine has risen to 160 or 165 degrees the hot water flowing into the heat exchange coil will remelt the paraffin so as to condition the heat storage device for a further operation.

Although paraffin melting at a temperature of 160 to 165 degrees has been given as an example, it will be appreciated that other substances may be used either in their pure form or mixed with freezing point depressants so that the temperature at which the change of state takes place, in other words, the temperature at which heat is exchanged back and forth between the heat storage medium and the water in the heat exchange coil, may be chosen to fit whatever operating range it is desired to cover.

The embodiment of the invention shown in Fig. 5, to some extent at least, combines the features of the two embodiments already described above. In this system the engine 110 is connected by an outlet pipe 112 by way of a venturi 114 and a thermostatic valve 116 to the inlet end of a heater radiator 118, while the outlet end of this radiator is connected by a return pipe 120 to the water inlet fitting 122 of the vehicle engine. The venturi 114 may be considered as essentially similar to the venturi 58 of Figs. 1 and 2 while the thermostatic valve 116 is of the ordinary engine cooling radiator type and is designed to open at, say, 150 degrees, for instance. The heat storage device indicated at 124 is of the type shown in Fig. 4 and has its inlet fitting connected to the portion of the water line 112 downstream of the thermostatic valve 116, in other words, between this valve and the inlet connection to the radiator 118. The outlet fitting of the heat storage device 124 leads to an automatic valve 126 similar to that shown in Fig. 3 and thence by way of a conduit 128 to the throat of the venturi 114. This conduit 128 may also contain a restriction of the type shown at 60 in Fig. 2.

This device operates in the following manner. Hot water flowing in the engine through the line 112 produces a low pressure at the Venturi throat 114 and then passes through the open valve 116 which will normally be open at temperatures above 150 degrees. As in the device of Fig. 1, this produces a flow of hot water through the heat exchange coil within the heat storage device 124 from top to bottom with the result that the paraffin or other heat storage substance therein is melted, the cooled water being returned by way of the line 128 to the venturi 114. This water, however, will not be colder than the temperature at which the heat storage substance, such as paraffin, for instance, changes state from a solid to a liquid. Meanwhile, of course, the major portion of the hot water flowing through the line 112 passes through the heater radiator 118 where a portion of its heat is exchanged to air circulated by a fan 130 driven by a motor 132. When the vehicle is stopped and the water in the tube 112 cools below 150 degrees the valve 116 will close. Meanwhile flow through the heat exchange coil has been prevented by the automatic valve 126.

When the vehicle is again started, the water leaving the engine 110 if it is below 150 degrees will be prevented from flowing directly to the radiator 118 by the closed valve 116. It therefore passes through the pipe 128 and automatic valve 126 and through the heat exchange coil and thence to the radiator 118. It is therefore warmed by the heat storage substance surrounding the heat exchange coil as in the example shown in Fig. 4. Whenever the temperature of the water leaving the engine rises above 150 degrees or so the valve 116 opens so as to permit flow of this warm water directly to the heater radiator. It also causes a flow through the heat exchange coil from top to bottom and although for a period this water may be below the point at which the heat storage substance changes state it will soon rise thereabove and will start melting the heat storage substance so as to condition the device for a new cycle of operation. In this arrangement the equivalent of the thermostatic valve 100 in Fig. 4 or 34 in Fig. 1 has been omitted so as to show a lower cost installation, it being anticipated that a restrictor such as is shown at 60 in Fig. 2 will be used. The size of this restrictor should be such as to give a flow of hot water to the radiator 118 at a rate such that the major portion of the available heat can be absorbed from the hot water by the radiator 118 and fan 130.

Although in the embodiments of the invention illustrated in Figs. 4 and 5 I have described the heat storage substance as being a material which changes state from a liquid to a solid at about the temperature at which heat exchange is desired to take place, it will be appreciated that this substance can be one which changes state from a liquid to a gas at the desired control point. This, however, involves the problem of providing a heat storage container which will withstand the pressure created when the material vaporizes. Also, although I have described the container 104 and heat storage device 124 as being filled with the heat storage substance it should be understood that sufficient space should be provided in these containers to take care of whatever expansion of the substance takes place with temperature change and with change of state.

Although I have described my invention as embodied in three alternative forms it will be appreciated that other arrangements and variations are contemplated and that the scope of the invention, therefore, is to be measured by the scope of the following claims.

I claim:

1. A heating system for a vehicle powered by a liquid cooled internal combustion engine, said system comprising a radiator for heating air, a liquid flow line extending from said engine to said radiator for heating said radiator from said engine, a return line extending from said radiator to said engine, means forming a heat storage device connected in the flow line from the engine to said radiator, said heat storage device being adapted to accumulate engine heat while the vehicle engine is in operation at high temperature and to supply heat to said radiator when the engine is operating at low temperature, means insulating said heat storage device to reduce the heat lost therefrom to an extremely low rate, and valve means to prevent flow to and from said heat storage device when the pressure differential thereacross is slight and is due principally to temperature differences within the system, said valve means being adapted to open to permit flow in either direction when the pressure differential thereacross is substantially greater than that due to said temperature differences.

2. In a heating system for a vehicle powered by a liquid cooled internal combustion engine, said system being of the type in which air for the passenger compartment of the vehicle is heated by a radiator which receives hot liquid from the vehicle engine and from which the liquid is returned to the engine, the improvement which comprises means forming a heat storage device connected between the engine and the radiator, said heat storage device being adapted to accumulate engine heat while the vehicle engine is in operation at high temperature and to supply heat to said radiator when the engine is in operation at low temperature, means insulating said heat storage device to reduce the heat loss therefrom to an extremely low rate, and means to prevent circulation through said heat storage device when said engine is not operating.

3. In a heating system for a vehicle powered by a liquid cooled internal combustion engine, said system being of the type in which air for the passenger compartment of the vehicle is heated by a radiator which receives hot liquid from the vehicle engine and from which the liquid is returned to the engine, the improvement which comprises means forming a liquid storage receptacle connected between the engine and the radiator so that liquid flows from the engine to the receptacle and from the receptacle to the radiator, means forming a by-pass around said receptacle, valve means for opening and closing said by-pass, means for causing a reverse flow through said receptacle when said by-pass valve is open, and means to prevent circulation through said receptacle when said engine is not operating.

4. In a heating system for a vehicle powered by a liquid cooled internal combustion engine, said system being of the type in which air for the passenger compartment of the vehicle is heated by a radiator which receives hot liquid from the vehicle engine and from which the liquid is returned through a separate line to the engine, the improvement which comprises means forming a closed insulated receptacle having a pair of connections thereto, one of said connections being connected to the engine and the other of said connections being connected to said radiator so that liquid flows from said engine to said receptacle and from said receptacle to said radiator, movable substantially imperforate partitioning means dividing the space within said receptacle so that one of said connections is on one side of said partition and the other of said connections is on the other side of said partition, conduit means forming a by-pass between said connections, valve means in said conduit means, flow responsive means for causing a reverse flow into and from said receptacle when said valve means is open and a temperature sensitive element for opening said valve when the engine temperature reaches a predetermined high level.

5. The combination called for in claim 4 in which the flow responsive means comprises a Venturi section connected between the engine and said valve means so that flow from said engine to said valve is through said venturi, means forming a tap at the throat of said venturi and said tap being connected to said one of said connections.

6. The combination called for in claim 4 in which the return line to said engine includes a thermostatic valve which tends to close when the temperature of the fluid passing therethrough exceeds a predetermined high level.

7. The combination called for in claim 1 in which the heat storage device comprises a heat exchanger submerged in a substance which changes its physical state at a relatively high temperature, said relatively high temperature being below the temperature of the liquid flowing from said engine after said engine has reached a stable operating temperature.

8. The combination called for in claim 7 in which said substance melts at a temperature between 140 degrees F. and 165 degrees F.

9. A heating system for a vehicle powered by a liquid cooled internal combustion engine, said system comprising a radiator for heating air, said radiator having inlet and outlet connections, a heat exchanger having inlet and outlet connections, means forming an insulated envelope enclosing said heat exchanger, a substance which changes its physical state at a temperature somewhat below the temperature of the cooling liquid in said engine when said engine is operating at a substantially stable temperature, said substance substantially filling the space between said heat exchanger and said envelope, and conduit means connecting said engine to the inlet connection of said heat exchanger, said outlet connection of said heat exchanger to the inlet connection of said radiator and the outlet connection of said radiator to said engine such that flow of the engine cooling liquid takes place from said engine to said heat exchanger and thence to said radiator and thence back to said engine.

10. The combination called for in claim 9 in which a thermostatic valve is included in said conduit means between the outlet connection of said radiator and said engine, said valve tending to close at a predetermined high temperature to limit flow of fluid through said radiator to a rate at which said radiator can remove the major portion of the usable heat from said fluid.

11. The combination called for in claim 9 in which said conduit means includes a valve to prevent flow therethrough unless the pressure differential across said valve is more than the amount due to temperature differences within the system.

12. The combination called for in claim 9 in which a thermostatic valve is included in said conduit means between the outlet connection of said radiator and said engine, said valve tending to close at a predetermined high temperature to limit flow of fluid through said radiator to a rate at which said radiator can remove the major portion of the usable heat from said fluid, and in which said conduit means includes a second valve, said second valve being adapted to close when the pressure differential thereacross is of the order of that produced by temperature differences within the system, the last said valve being adapted to open when the pressure differential thereacross is higher than the above amount.

SEYMOUR E. HEYMANN.

REFERENCES CITED

The following references are of record in the file of this patent:

UNITED STATES PATENTS

| Number | Name | Date |
|---|---|---|
| 1,346,331 | Muir | July 13, 1920 |
| 2,208,157 | Grutzner | July 16, 1940 |
| 2,366,089 | Dewan | Dec. 26, 1944 |